United States Patent
Borkowski et al.

(10) Patent No.: US 7,301,958 B2
(45) Date of Patent: Nov. 27, 2007

(54) CYCLE-EFFICIENT TDM TIMESLOT REMAPPING FOR NETWORK PROCESSING ENGINES

(75) Inventors: Daniel G. Borkowski, Lunenburg, MA (US); Nancy S. Borkowski, Lunenburg, MA (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 10/723,804

(22) Filed: Nov. 26, 2003

(65) Prior Publication Data

US 2005/0111475 A1 May 26, 2005

(51) Int. Cl.
*H04B 7/212* (2006.01)
(52) U.S. Cl. .............. 370/442; 370/458; 370/498; 370/345
(58) Field of Classification Search ............ 370/437, 370/468, 535, 442, 458, 498, 537, 345, 347, 370/280, 337
See application file for complete search history.

(56) References Cited

U.S. PATENT DOCUMENTS

| | | | | |
|---|---|---|---|---|
| 5,005,170 A | * | 4/1991 | Nelson | 370/535 |
| 6,519,257 B1 | | 2/2003 | Brueckheimer et al. | 370/395.2 |
| 6,611,531 B1 | | 8/2003 | Chen et al. | 370/458 |
| 6,965,619 B2 | * | 11/2005 | Bisson et al. | 370/543 |
| 7,061,884 B2 | * | 6/2006 | Shepherd et al. | 370/328 |
| 2003/0227906 A1 | * | 12/2003 | Hallman | 370/352 |

OTHER PUBLICATIONS

"PCT/US2004/038735 Search Report", (Feb. 24, 2005), 12 pages.

* cited by examiner

*Primary Examiner*—Ricky Q. Ngo
*Assistant Examiner*—Kibrom T Hailu
(74) *Attorney, Agent, or Firm*—Daly, Crolwy, Mofford & Durkee, LLP

(57) ABSTRACT

A method and apparatus for remapping channel data are presented. Multiple successive frames carrying data in timeslots are received. The timeslots are assigned to channels so that data for the channels includes interleaved data. The data from the multiple successive frames for each of a predetermined number of the timeslots are aggregated. The aggregated data is mapped, by timeslot, to produce a timeslot-based map. The aggregated data of the timeslot-based map is remapped to produce a channel-based map in which the data for the channels are grouped together by channel in the order that the data were received.

31 Claims, 6 Drawing Sheets

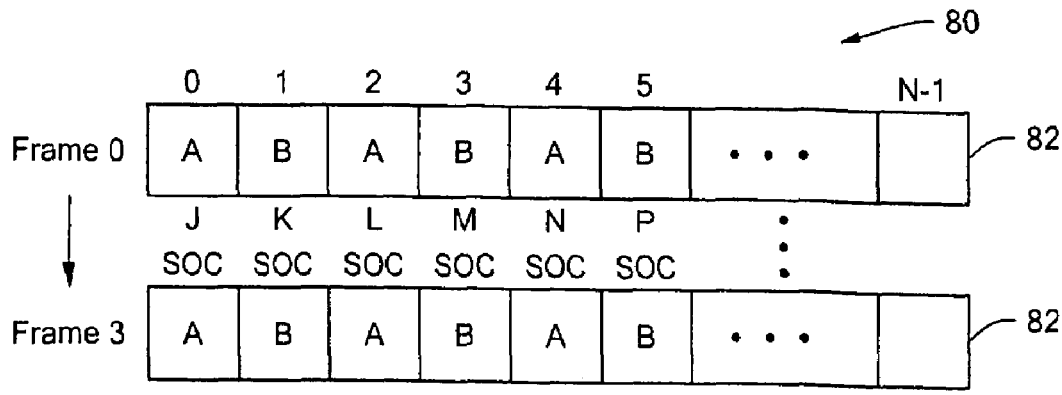
*FIG. 4A*
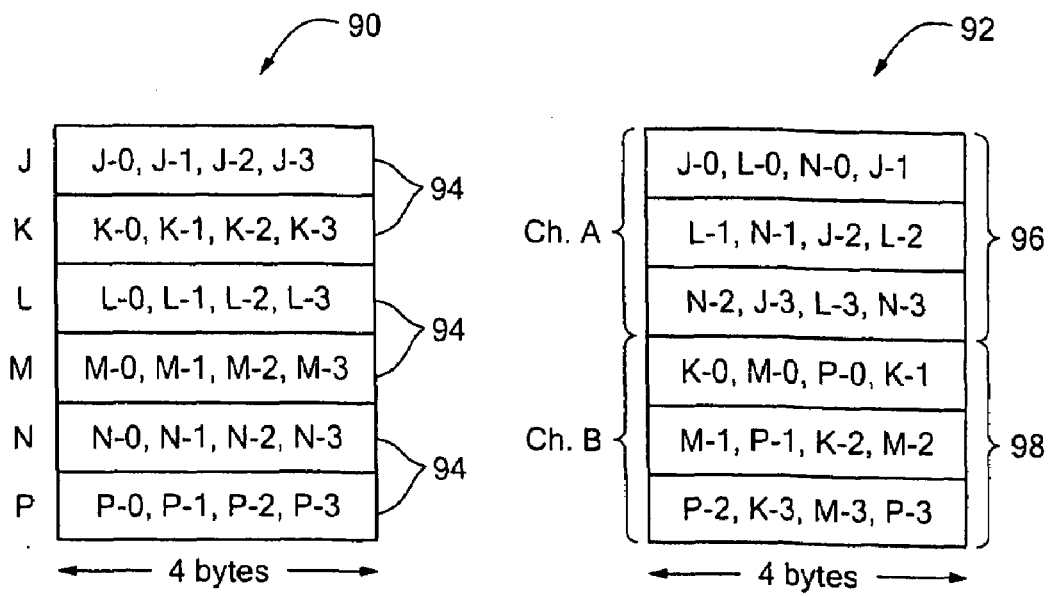
*FIG. 4B*    *FIG. 4C*

CYCLE-EFFICIENT TDM TIMESLOT REMAPPING FOR NETWORK PROCESSING ENGINES

BACKGROUND

Network processors that handle data received over a framed serial link, e.g., a T1 trunk, typically perform an aggregation of time-division multiplexed (TDM) timeslots. A timeslot configuration is used to determine which TDM timeslots from each trunk frame are to be combined into "channels". The network processor also aggregates some number of frames of data for each channel, for example, a byte from the same timeslot in each of four frames for a 32-bit word. Each channel's data for a given frame may include "M" timeslots, where M is the channel size or number of timeslots used by that channel. The timeslot configuration enables up to N unique channels within a trunk, where N is the number of timeslots per frame on the trunk (e.g., 32 for E1, 24 for T1).

Such network processors require that the channels are "non-overlapping" (or non-interleaved), that is, that the timeslots assigned to one channel do not appear between timeslots belonging to another channel. For example, a configuration in which timeslots 0,1,2 belong to channel X and timeslots 3,4,5 belong to channel Y would be supported, while a configuration in which timeslots 0,2,4 belong to channel X and timeslots 1,3,5 belong to channel Y would not be supported.

DESCRIPTION OF THE DRAWINGS

FIG. 4A is a depiction of trunk frames containing overlapping channel data.

FIG. 4B is an exemplary timeslot-based map (in an HDMA buffer) for the overlapping channel data (shown in FIG. 5A) aggregated and written by the HSS interface.

FIG. 4C is an exemplary channel-based map (in an NPE buffer) for the aggregated overlapping channel data (shown in FIG. 4B) after remapping by the NPE.

DETAILED DESCRIPTION

Figure 1:
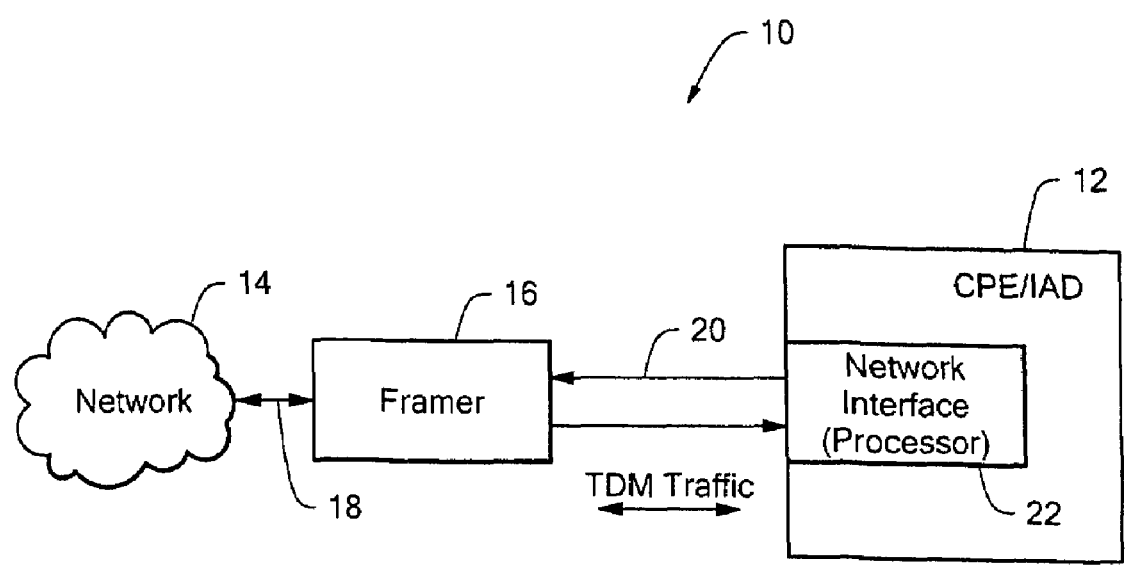
FIG. 1 is a block diagram of a networking environment in which a system is configured to transmit and receive frames of data in a digital time-division multiplexed (TDM) serial data stream on a trunk.

Referring to FIG. 1, a networking environment 10 includes a system 12 connected to a network 14. In the illustrated embodiment, the system 12 is coupled to the network 14 by a framer 16. The system 12 may be some type of Customer Premises Equipment (CPE) or access device, as shown. In one embodiment, the network 14 may include a Public Switched Telephone Network (PSTN). The system 12 may be configured to support both voice and data applications. The framer 16 receives analog data from the network 14, and provides multi-channel time-division multiplexed (TDM) digital traffic over a high-speed serial (HSS) link 20 to a network interface 22 in the system 12. In one embodiment, as will be described, the network interface 22 is implemented as a network processor.

In the illustrated embodiment, the TDM traffic includes a sequence of timeslots forming frames. The frames are repeated at a sampling rate, and each channel occupies the same timeslot or timeslots in successive frames. The number of timeslots per frame is based on the carrier/standard that is used, for example, a T1 or E1 trunk. Typically, a timeslot corresponds to single byte of data. In one embodiment, as described herein, the HSS link 20 uses a data link protocol that is based on High-Level Data Link Control (HDLC). The data carried in the TDM timeslots need not be HDLC data, however. It could be Asynchronous Transfer mode (ATM) data (that is, ATM cells) or some other type of data.

Figure 2:
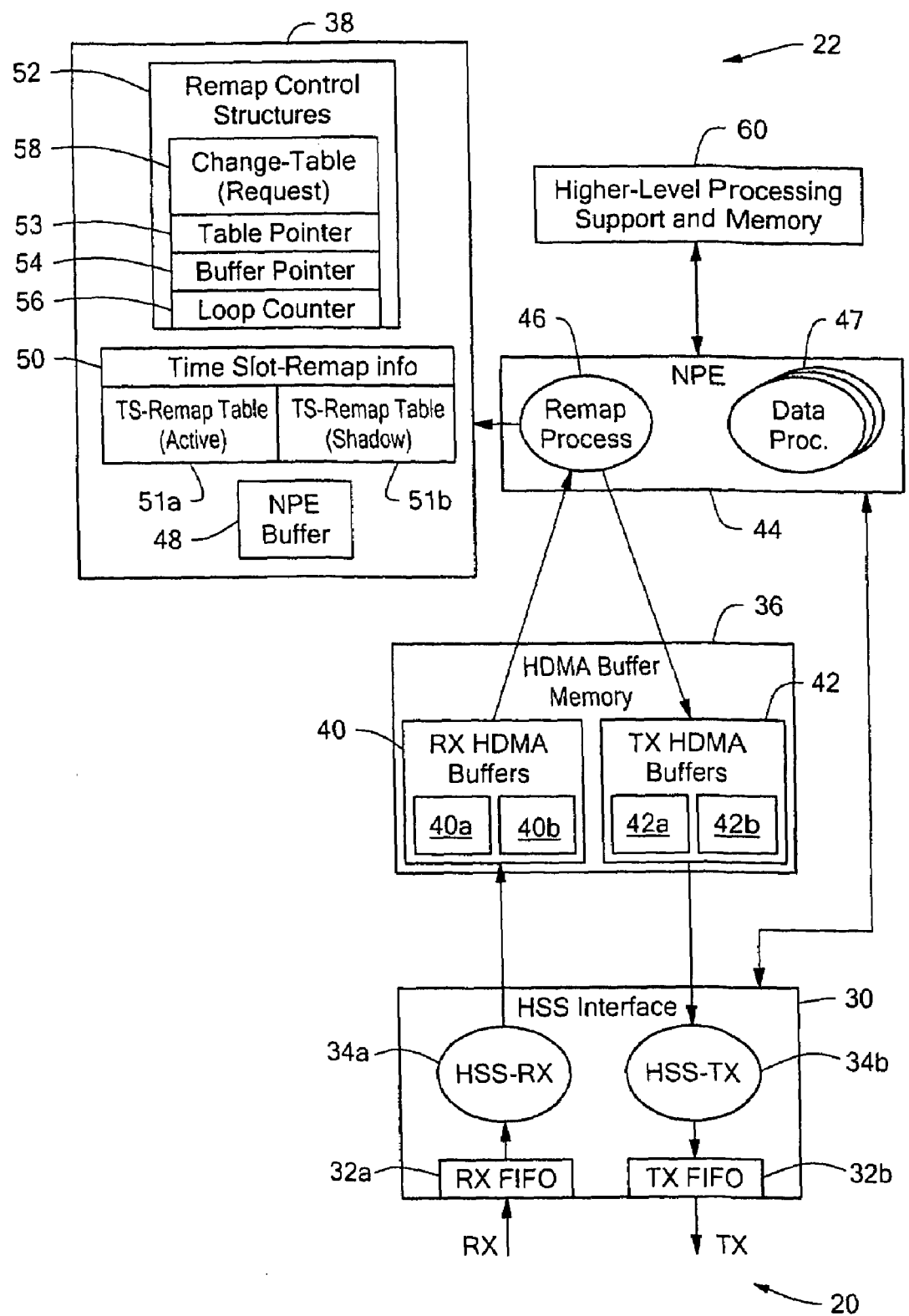
FIG. 2 is a block diagram of a network processor (in the system of FIG. 1) having a high-speed serial (HSS) interface and a network processor engine (NPE).

Referring to FIG. 2, the network processor 22 includes at least one high-speed serial (HSS) port or interface 30, for example, an interface supporting one or more protocols such as T1, E1 and J1. Alternatively, or in addition, the HSS interface 30 could support DS-3 or other types of framing. The HSS interface 30 may support other protocols, such as Multi-Vendor Integration Protocol (MVIP) and General Circuit Interface (GCI), as well. The HSS interface 30 includes a buffer shown as a receive (RX) FIFO 32a to store received frame data and a buffer shown as a transmit (TX) FIFO 32b to store outgoing data. In the illustrated embodiment, the HSS interface 30 is a multi-threaded processor configured to execute a receive processing thread (HSS-RX) 34a and a transmit processing thread (HSS-TX) 34b. Alternatively, the functionality of the receive and transmit processing could be implemented in hardware.

The network processor 22 also includes a network processor engine (NPE) 44 to perform data (e.g., layer 2) processing on HDLC frames. The NPE 44, also a multi-threaded processor, uses at least one thread to execute a remap process 46, and one or more additional threads to perform the data processing (indicated by reference numeral 47). The data processing threads 47 operate on channels, not timeslots. Thus, the remap process 46 is used by the NPE 44 to provide a channel-based mapping of the TDM data provided by the HSS interface 30, as will be described. It will be understood that the NPE 44 may be implemented to include a processor (or controller) with memory for storing instructions and data.

The network processor 22 also includes an HSS Direct Memory Access (HDMA) buffer memory 36 used by the HSS interface 30 and an NPE data memory 38 used by the NPE 44. The HDMA buffer memory 36 includes RX HDMA buffers 40a, 40b and TX HDMA buffers 42a, 42b. The HDMA buffers store aggregated receive data prior to any remapping. A pair of buffers is used in "ping-pong" fashion, that is, once a first buffer is filled by the HSS-RX thread 34a and made available to the NPE 44, the second buffer is filled by the HSS-RX thread 34a while the NPE 44 operates on the first buffer. The NPE data memory 38 includes an NPE buffer 48 to store remapped data and timeslot-remap information 50 in the form of a timeslot-remap table 51a. The timeslot-remap table 51a is configured to provide input to the NPE remap process 46 during remapping, as will be described. Also stored in the NPE data memory 38 are remap control structures 52 that store the following: a timeslot-remap table pointer 53; an NPE buffer pointer 54; a loop counter 56; and a change-table request indicator 58, all of which are used by the NPE remap process 46.

The network processor 22 can also include higher level processing support and memory, indicated by reference numeral 60. For the sake of clarity, the details of the NPE HDLC (data) processing as well any the higher-level processing are omitted herein, as they are not considered pertinent to the remap process 46.

As shown in FIG. 2, the timeslot-remap information 50 can further include a second, "shadow" copy of the timeslot-remap table, indicated by reference numeral 51b. The timeslot-remap table 51a is the active table that is used by the NPE remap software. The shadow table 51b is used to store a new configuration as it is being programmed—an action that could take an extended period of time. When a complete new configuration is stable and ready to be used, the NPE software sets the change-table request indicator 58 (which may be implemented as a single bit) to signal to the NPE remap process 46 that a timeslot-remap table update has occurred.

The HSS interface 30, more particularly, the HSS-RX thread 34a, services received data (stored in the RX FIFO 32a) by storing the data in an empty one of the "ping-pong" RX HDMA buffers 40a, 40b. The NPE remap process 46 is signaled to run by the HSS-RX thread or context 34a when one of the RX HDMA buffers 40a, 40b is full. On transmit, the NPE remap process 46 is signaled to run by the HSS interface 30 when one of the TX HDMA buffers 42a, 42b is empty. The HSS-TX thread 34b reads data from a full TX HDMA buffer 42. Typically, the data is buffered in the TX FIFO 32b awaiting transmission over the HSS link to the framer 16. It will be appreciated that the HSS-RX and HSS-TX threads perform a DMA function and may be implemented as hardware DMA engines.

In the illustrated embodiment, the HSS interface 30 requires that all data be exchanged between the HSS interface 30 and the NPE 44 as words (four bytes). To aggregate four bytes, four frames are processed. It will be understood that the number of timeslots per frame and number of frames to be aggregated by the HSS interface process and the remapping process (collectively, referred to as "channelization"), are a matter of design choice. In the illustrated embodiment, the size of each RX (and TX) HDMA buffer is sufficient to store four (number of frames) times the number of timeslots (per frame) to be supported.

Figure 3A:
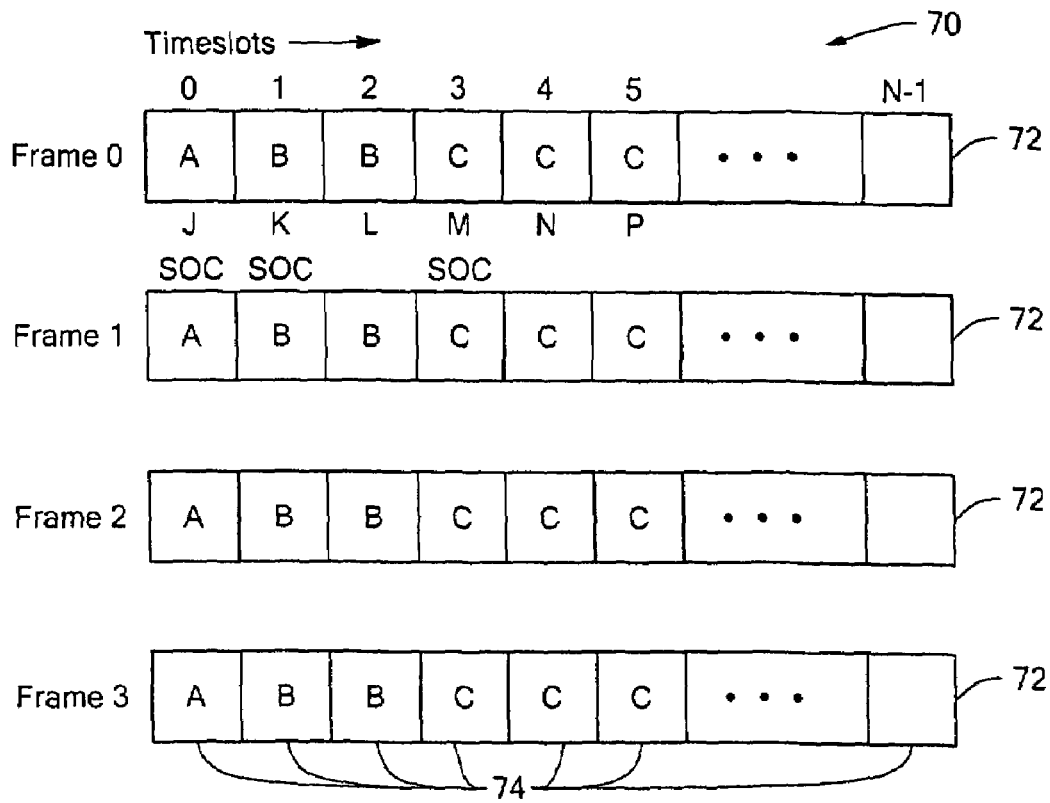
FIG. 3A is a depiction of trunk frames containing non-overlapping channel data.

As illustrated in FIG. 3A, received frame data 70 can include four consecutive frames 72 of N timeslots 74, each frame containing non-overlapping channel data. Channel data is said to be non-overlapping (or non-interleaved) if each channel's data is carried in one timeslot or multiple, contiguous timeslots. For example, as shown, Channel A data in timeslot 0 is followed by Channel B data in timeslots 1 and 2, which is followed by Channel C data in timeslots 3-5, and so on. The HSS-RX thread 34a reads four frames worth of data for each timeslot and aggregates the data for each channel. For ease of discussion, timeslots 0 through 5 are identified by the letters J, K, L, M, N and P, respectively, and a byte is denoted by 'timeslot'-'frame number'.

Conventional channelization techniques, concerned with only non-overlapping channel data, would perform an aggregation of the 4 bytes as well as any necessary combination of channel data, if a channel is assigned multiple, contiguous timeslots, according to a predetermined timeslot configuration. Thus, after such channelization, Channel A data includes (J-0; J-1; J-2; J3), Channel B data includes (K-0, L-0; K-1, L-1; K-2, L-2; K-3, L-3) and Channel C data includes (M-0, N-0, P-0; M-1, N-1, P-1; M-2, N-2, P-2; M-3, N-3, P-3). Such channelization would be performed by the serial port interface (such as the HSS interface).

Figure 3B:
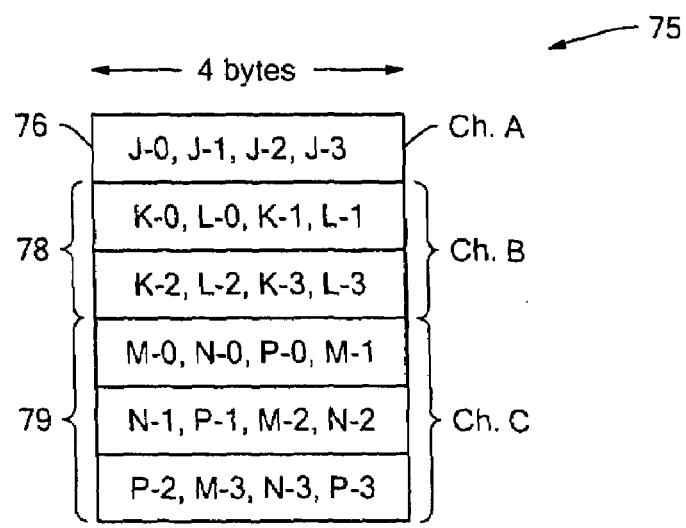
FIG. 3B is an exemplary channel-based map for the non-overlapping channel data shown in FIG. 3A.

FIG. 3B shows a channel-based map 75 of the channel data for Channel A (indicated by reference numeral 76), Channel B (indicated by reference numeral 78) and Channel C (indicated by reference numeral 79) after each channel's timeslot data is combined for a given frame (according to a "start-of-channel" or "SOC" indicator indicating the start of a channel's timeslot data carried in one timeslot or multiple, contiguous timeslots) and aggregated for multiple frames, according to a conventional channelization process. Because the frames contain only non-overlapping channel data, the data for each channel can be combined and aggregated in the order in which it is received in the timeslots. The channel data can then be stored in buffers (like the HDMA buffers) by the serial port interface directly and made available for data processing, which requires that the data be organized according to channel.

For some applications, however, the formatting of a frame in terms of non-overlapping channels is overly restrictive. For example, it is possible that a service provider may allocate non-contiguous timeslots to customers to optimize usage of bandwidth. Thus, for applications that may need to receive data in such a fashion, for example, voice data over an ISDN connection, support for overlapping (or interleaved) channels in a frame is desirable. When the channel data are overlapping or interleaved, timeslots assigned to one channel may appear between (or be interleaved with) timeslots belonging to another channel (or other channels). The remap process 46 provides such capability. It enables frame data containing overlapping channel data to be presented to the NPE data processing as if that data were received in a frame having non-overlapping channel assignments and processed (during channelization) in the conventional manner, as described earlier with reference to FIGS. 3A and 3B.

FIG. 4A shows received frame data 80 that includes four consecutive frames 82 (of N timeslots) in which channel data for different channels are interleaved. In the example shown, two channels A and B are assigned to alternating timeslots. Data for Channel A is assigned to even timeslots and data associated with Channel B is assigned to odd timeslots. The two-channel example is intended as a simple example of interleaved channel data. Of course, there could be more than two channels, and each frame could include contiguous timeslot assignments for the same channel as well. Thus, the pattern of channel assignments could include, for example, 'ABAACCA', where Channel A data appears in timeslots 0, 2, 3 and 6, Channel B data appears in timeslot 1 and, Channel C data appears in timeslots 4 and 5. In this latter example, the frame data includes both interleaved and non-interleaved channel data.

To handle overlapping/interleaved channel data, the HSS-RX thread 35a treats every timeslot as a separate channel. In the illustrated embodiment, it operates to pass every 4-bytes of timeslot data to the RX HDMA buffer memory 40 by recognizing each timeslot as an 'SOC'. This results in a four-byte word for each timeslot. The word thus includes the data for four consecutive frames. After each group of 4 consecutive frames of data are received and processed by the HSS-RX process, that process provides an HDMA signal to the NPE 44 to indicate that an RX HDMA buffer is ready for processing by the NPE 44.

FIGS. 4B and 4C show the buffer content (or map) of the channel data prior to remapping (FIG. 4B), indicated by reference numeral 90, and following remapping (FIG. 4C), indicated by the reference numeral 92. More specifically, FIG. 4B shows the contents of an HDMA buffer when the four frames of overlapping channel data (shown in FIG. 4A) are aggregated and written to the buffer by the HSS_RX thread. The map 90 thus represents a timeslot-based mapping of the data. FIG. 4C shows the contents of an NPE buffer after the data stored in the HDMA buffer is remapped by the remap process 46 of the NPE 44, thus representing a channel-based mapping of the data.

Referring first to FIG. 4B, the timeslot-based map 90 includes aggregated data (in the example, words or four bytes) 94 for each timeslot J, K, L, M, N and P (timeslots 0 through 5). It will be appreciated that, in this example, the number of timeslots supported in the buffer is 6. A different number of timeslots could be used. Once the buffer is full, as mentioned earlier, the HSS_RX thread 34a signals to the NPE 44 that data is available for processing by the NPE 44. When the NPE 44 receives the signal, the NPE remap process 46 remaps the data to a channel-based map in NPE buffer 42 according to a remap configuration provided in the active timeslot-remap table 51a.

Referring now to FIG. 4C, after remapping, the NPE buffer 42 stores all of the Channel A data, that is, the combined and aggregated Channel A data 96, together, and stores all of the Channel B data 98 together. In the example shown, the channel-based map 92 generated by the remapping process 46 stores 3 words of Channel A data followed by 3 words of Channel B data. The remapping process 46 brings together the channel data for each channel in each frame. Thus, for Channel A, the first word includes (J-0, L-0, N-0) from frame 0 and (J-1) from frame 1. The second word includes (L-1, N-1) from frame 1 and (J-2, L-2) from frame 2. The third word includes (N-2) from frame 2 and (J-3, L-3, N-3) from frame 3. For Channel B, the first word (fourth word in buffer) includes (K-0, M-0, P-0) from frame 0 and (K-1) from frame 1, the second word includes (M-1, P-1) from frame 1 and (K-2, M-2) from frame 2, and word three includes (P-2) from frame 2 followed by (K-3, M-3, P-3) from frame 3.

Figure 5:
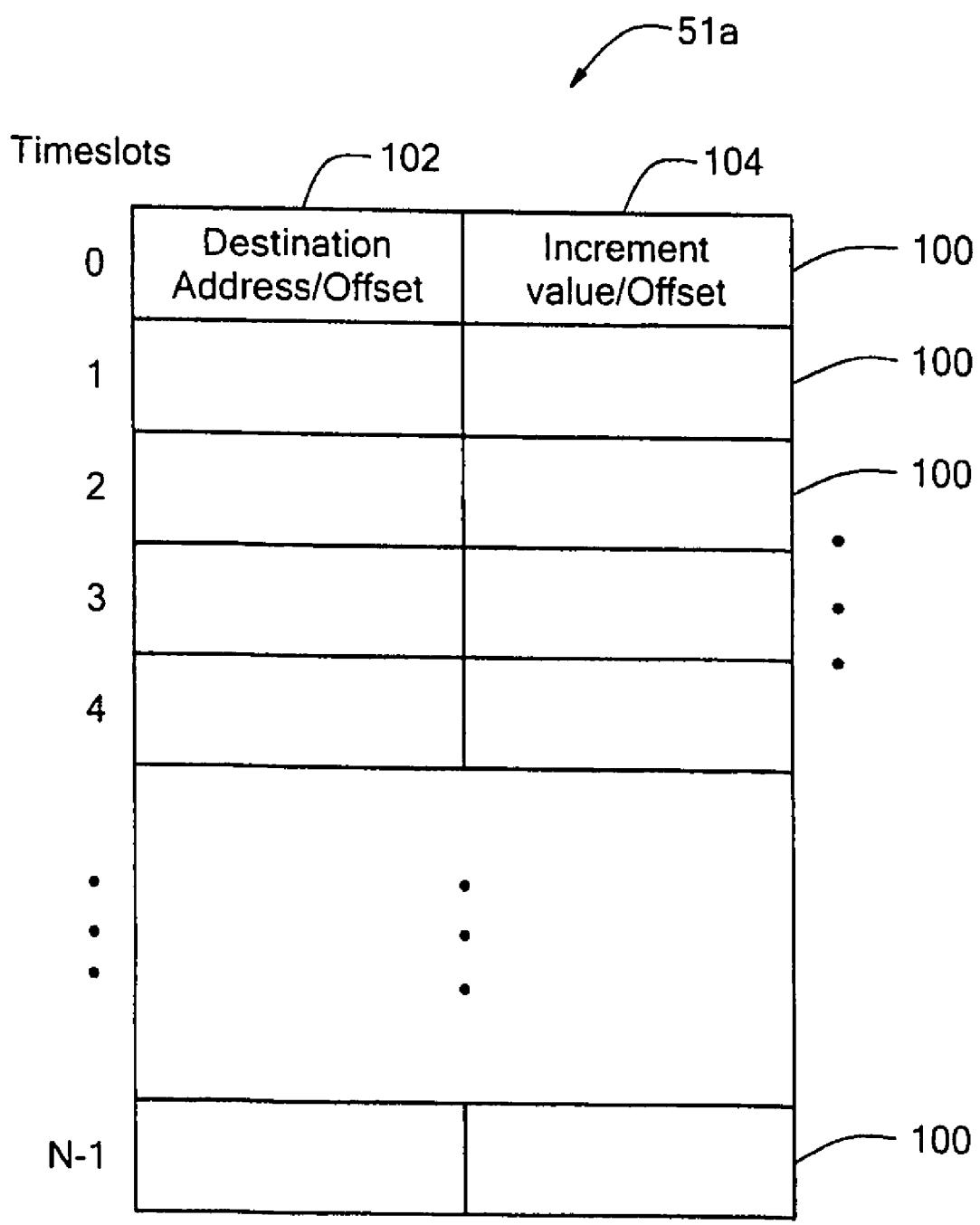
FIG. 5 is an exemplary format of a timeslot-remap table.

Referring to FIG. 5, an exemplary format of the active timeslot-remap table 51a (as well as shadow copy 51b) is shown. The timeslot-remap table 51a includes "N" entries 100, one for each of N timeslots in a frame. Each entry 100 includes a destination address/offset field 102 and an increment value (offset) field 104. The destination address/offset field 102 is used to provide a destination address for the buffer location in which a first of the four aggregated bytes of channel data is to be stored. For a smaller field, for example, 1-byte field, this value is merely an offset which is added to a known based address. If a larger field, e.g. 2-byte field, is used, it is possible to store in the destination address/offset field 102 the actual destination address (base address plus offset). The increment value field 104 provides an additional offset to be used in storing the additional bytes of data for a given timeslot. The size of these fields is a matter of design choice as well. A larger field size provides for fewer processing cycles (better performance) with higher memory usage, whereas a smaller field size provides smaller memory usage with a higher number of processing cycles.

Figure 6:
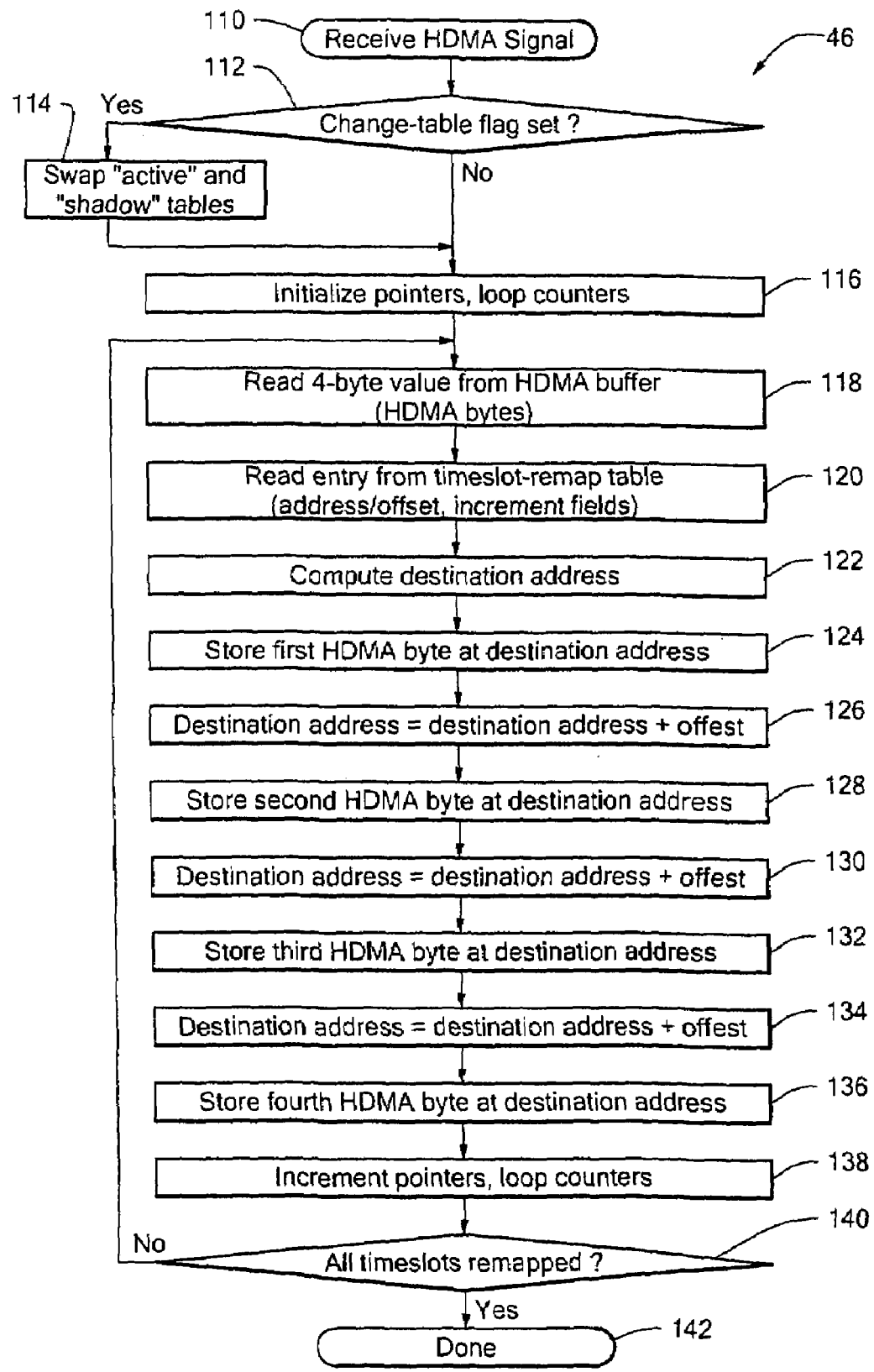
FIG. 6 is a flow diagram illustrating an exemplary remapping process.

Referring to FIG. 6, the remapping operation of the remap process 46 (for a word-based implementation) is as follows. Upon receiving 110 an HDMA signal from the HSS_RX thread (for 4 frames of data received), the process 46 begins by examining 112 the timeslot-remap table control structure to determine if the change-table request bit 58(shown in FIG. 2) is set. If the process 46 determines that the change-table request bit is set, the process 46 swaps 114 the "active" and "shadow" remap tables (tables 51a, 51b, respectively, also shown in FIG. 2), and thus executes the remapping using the new "active" remap table. If it is determined that the change-table request bit is not set, the process 46 proceeds with the remapping operation using the "active" copy of the timeslot-remap table.

The process 46 begins the remapping operation by initializing 116 the HDMA buffer and timeslot-remap table pointers (pointers 54 and 53, FIG. 2) as well as loop counter 56 (FIG. 2). The loop counter 56 is programmed to count the number of timeslots to be remapped. In the example shown in FIGS. 4 and 5A-5B, the maximum count value of the loop counter 56 would be 6. More generally, this number corresponds to the number of timeslots buffered in the HDMA buffer that has been filled by the HSS interface (and is therefore a function of the buffer size).

After initialization of the loop counter and pointers, the process 46 reads 118 a 4-byte timeslot value from the HDMA buffer ("HDMA bytes") at the location pointed to by the HDMA buffer pointer 54. It also reads 120 a corresponding entry for that timeslot from the timeslot-remap table 51a. The process computes 122 a destination address using a known base address and the address offset stored in the address offset field 102 of the entry. (It will be appreciated that, if a larger entry size is used and the destination address is available in the time-slot remap table, this computation is unnecessary.) The process stores 124 a first one of the HDMA bytes at the destination address. The process adds 126 the increment (or offset) value (from the increment value field 104 of the timeslot entry field 100) to the destination address to form a new destination address. The process then stores 128 the second one of the HDMA bytes at the destination address. The process adds 130 the increment (or offset) value (from the increment value field 104) to the destination address to form a new destination address. The process then stores 132 the third one of the HDMA bytes at the destination address. The process adds 134 the increment (or offset) value (from the increment value field 104) to the destination address to form a new destination address. The process stores 136 the fourth (and last) one of the HDMA bytes at the destination address. Thus, for a number of bytes "m", the process repeats "m" times the processing tasks of updating the destination address (by adding the increment or offset value to the current destination address) for a next consecutive byte and storing such byte at the destination address. Having processed the first timeslot, the process advances 138 the pointers (HDMA buffer and timeslot-remap table pointers) and the loop counter. The process determines 140 if there are more timeslots to remap. This determination is based on the current state of the loop counter. If there are more timeslots to be remapped, the process returns to 118 to read the 4-bytes of data for the next timeslot (the timeslot now pointed to by the HDMA buffer pointer). Otherwise, the remapping is complete and the process terminates 142.

After all of the timeslots of a frame on a trunk have been remapped, the NPE buffer 48 used by the remap process will contain timeslot data aggregated according to the channel assignments specified in the timeslot-remap table (as was illustrated in FIG. 5B). The data processing software of the NPE can then process the data of those channels based on configured channel sizes and channel starting addresses within the destination buffer.

It will be appreciated that, in the transmit direction, the remap process 46 operates generally in the reverse manner, using the addresses of bytes stored in an NPE buffer 48 to determine (from the timeslot-remap table 51a) the frame timeslot to which each byte belongs. Thus, data provided to the transmit remap process is read from the NPE buffer 48 and contains timeslot data aggregated according to channel assignments (that is, the channel-based map). After the remap operation in the transmit direction, the data is stored in a timeslot-based map in one of the TX HDMA buffers 42a, 42b, with each "m" bytes including data for "m" frames of one timeslot.

The above-described remap mechanism thus provides the capability to support overlapping channel assignments on a trunk. In addition, it allows a timeslot-channel configuration to be altered "on the fly" without disrupting any other timeslots or channels. The approach used for the "on-the-fly" table configuration changes allows the timeslot-remap table changes to be synchronized to the HDMA signal, ensuring that the remap operation is performed in a deterministic fashion.

Although the remap mechanism has been described with respect to framed serial TDM data provided by a framer, it will be appreciated that the remap mechanism could be applied to unframed data as well. For example, a counter could be used to derive a 'pseudo-frame' signal, and the remap processing could proceed based on the 'pseudo-frame' signal in much the same way as it would in the case of a 'true frame' signal.

Other embodiments are within the scope of the following claims. For example, although the illustrated embodiment is a software implementation, it will be understood that the remapping mechanism could be realized in a silicon implementation for better throughput performance.

What is claimed is:

1. A method comprising:
receiving successive frames carrying data in timeslots, the timeslots being assigned to channels so that data for the channels comprises interleaved data;
aggregating the data from successive frames for each of a predetermined number of the timeslots;
mapping the aggregated data, by timeslot, to produce a timeslot-based map, the mapping comprising storing the aggregated data in a first buffer; and
remapping the aggregated data in the timeslot-based map to produce a channel-based map by storing the aggregated data stored in the first buffer in a second buffer according to timeslot-remap information to re-order the aggregated data stored in the timeslot-based map, the timeslot-remap information comprising a table, and the table comprising an address and an increment value associated with each of the timeslots in a frame.

2. The method of claim 1 wherein, in the channel-based map, the data for the channels are grouped together, by channel, in the order in which the data were received.

3. The method of claim 1 wherein remapping comprises:
remapping the aggregated data for each timeslot, in sequential order;
reading bytes of aggregated data for the timeslot from the first buffer;
determining a destination address in the second buffer according to the associated address in the table; and
storing the first byte of the aggregated data for the timeslot in the second buffer at the destination address.

4. The method of claim 3 wherein remapping comprises:
incrementing the destination address by the associated increment value;
storing a next byte of the aggregated data for the timeslot in the second buffer at the incremented destination address; and
repeating incrementing and storing a next byte until all of the bytes of the aggregated data for the timeslot have been stored in the second buffer.

5. The method of claim 1, further comprising:
maintaining two copies of the table, the two copies including an active table and a shadow table.

6. The method of claim 5 wherein the table used during the remapping the aggregated data for each timeslot is the active table.

7. The method of claim 6, further comprising:
enabling a re-configuration of the table by a modification of the shadow table; and
providing an indicator that the table has been re-configured.

8. The method of claim 7 wherein remapping further comprises:
prior to reading any bytes of data from the first buffer, determining from the indicator if the table has been reconfigured; and
if it is determined that the table has been reconfigured, swapping the shadow table with the active table.

9. The method of claim 7 wherein the indicator comprises a signal to indicate that a reconfiguration of the table has occurred.

10. The method of claim 1 wherein the successive frames are T1 frames.

11. The method of claim 1 wherein the successive frames are E1 frames.

12. The method of claim 1 wherein the successive frames are J1 frames.

13. The method of claim 1 wherein the data includes High-Level Data Link Control data.

14. The method of claim 1 wherein the data includes Asynchronous Transfer Mode data.

15. The method of claim 1 wherein the data comprises interleaved data and non-interleaved data.

16. An article comprising:
a storage medium having stored thereon instructions that when executed by a machine result in the following:
for successive frames carrying data in timeslots assigned to channels so that data for the channels comprises interleaved data, aggregating the data from successive frames for each of a predetermined number of the timeslots;
mapping the aggregated data, by timeslot, to produce a timeslot-based map, the mapping comprising storing the aggregated data in a first buffer; and
remapping the aggregated data in the timeslot-based map to produce a channel-based map by storing the aggregated data stored in the first buffer in a second buffer according to timeslot-remap information to re-order the aggregated data stored in the timeslot-based map, the timeslot-remap information comprising a table, and the table comprising an address and an increment value associated with each of the timeslots in a frame, remapping comprising:
reading bytes of aggregated data for the timeslot from the first buffer;
determining a destination address in the second buffer according to the associated address in the table; and
storing the first byte of the aggregated data for the timeslot in the second buffer at the destination address.

17. The article of claim 16 wherein, in the channel-based map, the data for the channels are grouped together, by channel, in the order in which the data were received.

18. A processor comprising:
a serial interface;
a network processor engine of multiple execution threads coupled to the serial interface;

wherein the serial interface is configured to process successive frames carrying data in timeslots, the timeslots assigned to channels so that data for the channels comprises interleaved data, the processing including aggregating the data from successive frames for each of a predetermined number of the timeslots and mapping the aggregated data, by timeslot, to produce a timeslot-based map; and wherein at least one of the multiple execution threads, during execution, operates to remap the aggregated data in the timeslot-based map to produce a channel-based map by storing aggregated data stored in a first buffer in a second buffer according to timeslot-remap information by using the timeslot-remap information to re-order the aggregated data stored in the timeslot-based map, the timeslot-remap information comprising a table, and the table comprising an address and an increment value associated with each of the timeslots in a frame; wherein to remap comprises:

reading bytes of aggregated data for the timeslot from the first buffer;

determining a destination address in the second buffer according to the associated address in the table; and storing the first byte of the aggregated data for the timeslot in the second buffer at the destination address.

19. The processor of claim 18 wherein, in the channel-based map, the data for the channels are grouped together, by channel, in the order in which the data were received.

20. The processor of claim 18 wherein the successive frames are T1 frames.

21. The processor of claim 18 wherein the successive frames are E1 frames.

22. The processor of claim 18 wherein the successive frames are J1 frames.

23. The processor of claim 18 wherein the data includes High-Level Data Link Control data.

24. The processor of claim 18 wherein the data includes Asynchronous Transfer Mode data.

25. The processor of claim 18 wherein the data comprises interleaved data and non-interleaved data.

26. A system comprising:
a framer adapted to be coupled to a network;
a network access device coupled to the framer, the network access device comprising a network processor; and
the processor comprising:
a serial interface;
a network processor engine of multiple execution threads coupled to the serial interface;
wherein the serial interface is configured to process successive frames carrying data in timeslots, the timeslots assigned to channels so that data for the channels comprises interleaved data, the processing including aggregating the data from successive frames for each of a predetermined number of the timeslots and mapping the aggregated data, by timeslot, to produce a timeslot-based map; and wherein at least one of the multiple execution threads, during execution, operates to remap the aggregated data in the timeslot-based map to produce a channel-based map by storing aggregated data stored in a first buffer in a second buffer according to timeslot-remap information by using the timeslot-remap information to re-order the aggregated data stored in the timeslot-based map, the timeslot-remap information comprising a table, and the table comprising an address and an increment value associated with each of the timeslots in a frame; wherein to remap comprises:

reading bytes of aggregated data for the timeslot from the first buffer;

determining a destination address in the second buffer according to the associated address in the table; and storing the first byte of the aggregated data for the timeslot in the second buffer at the destination address;

incrementing the destination address by the associated increment value; and storing a next byte of the aggregated data for the timeslot in the second buffer at the incremented destination address.

27. The system of claim 26 wherein, in the channel-based map, the data for the channels are grouped together, by channel, in the order in which the data were received.

28. The article of claim 16 wherein remapping comprises:
incrementing the destination address by the associated increment value; and storing a next byte of the aggregated data for the timeslot in the second buffer at the incremented destination address.

29. The article of claim 28 wherein remapping comprises repeating incrementing and storing a next byte until all of the bytes of the aggregated data for the timeslot have been stored in the second buffer.

30. The processor of claim 18 wherein to remap comprises:
remapping the aggregated data for each timeslot, in sequential order;
incrementing the destination address by the associated increment value;
storing a next byte of the aggregated data for the timeslot in the second buffer at the incremented destination address; and
repeating the incrementing and the storing a next byte until all of the bytes of the aggregated data for the timeslot have been stored in the second buffer.

31. A method comprising:
mapping aggregated data, by timeslot, to produce a timeslot-based map, the mapping comprising storing the aggregated data in a first buffer; and
remapping the aggregated data in the timeslot-based map to produce a channel-based map by storing the aggregated data stored in the first buffer in a second buffer according to timeslot-remap information to re-order the aggregated data stored in the timeslot-based map, the timeslot-remap information comprising a table, and the table comprising an address and an increment value associated with each of the timeslots in a frame, remapping comprising:
reading bytes of aggregated data for the timeslot from the first buffer;
determining a destination address in the second buffer according to the associated address in the table;
storing the first byte of the aggregated data for the timeslot in the second buffer at the destination address;
incrementing the destination address by the associated increment value;
storing a next byte of the aggregated data for the timeslot in the second buffer at the incremented destination address; and
repeating the incrementing and the storing a next byte until all of the bytes of the aggregated data for the timeslot have been stored in the second buffer.

* * * * *